United States Patent
Savu et al.

(10) Patent No.: US 8,613,352 B2
(45) Date of Patent: Dec. 24, 2013

(54) ONE-WAY CLUTCH RETAINER

(75) Inventors: Virgiliu-Adrian Savu, Allen Park, MI (US); Damien J. Fron, Rochester Hills, MI (US); Alfred J. Chiesa, Farmington Hills, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 255 days.

(21) Appl. No.: 13/003,322

(22) PCT Filed: Jul. 9, 2009

(86) PCT No.: PCT/US2009/050082
§ 371 (c)(1),
(2), (4) Date: Jan. 10, 2011

(87) PCT Pub. No.: WO2010/006154
PCT Pub. Date: Jan. 14, 2010

(65) Prior Publication Data
US 2011/0108383 A1 May 12, 2011

Related U.S. Application Data

(60) Provisional application No. 61/079,561, filed on Jul. 10, 2008.

(51) Int. Cl.
*F16D 13/74* (2006.01)
(52) U.S. Cl.
USPC ........................ 192/113.32; 60/345
(58) Field of Classification Search
USPC .............. 192/41 R, 113.32, 110 B, 192/45.017–45.019; 60/345
See application file for complete search history.

(56) References Cited

U.S. PATENT DOCUMENTS

| 4,009,570 A | 3/1977 | Ohkuoo et al. |
| 4,143,561 A | 3/1979 | Melhorn |
| 5,013,287 A | 5/1991 | Hayakawa et al. |
| 5,038,903 A | 8/1991 | Akagi et al. |
| 5,511,642 A | 4/1996 | Klotz et al. |
| 5,676,230 A | 10/1997 | Awaji et al. |
| 5,788,034 A | 8/1998 | Maruki et al. |

(Continued)

FOREIGN PATENT DOCUMENTS

| CN | 2833227 Y | 11/2006 |
| JP | 08247174 | 9/1996 |

OTHER PUBLICATIONS

International Search Report and Written Opinion under date of Sep. 3, 2009 in connection with PCT/US2009/050082.

*Primary Examiner* — David D Le
*Assistant Examiner* — Stacey Fluhart
(74) *Attorney, Agent, or Firm* — Quarles & Brady LLP

(57) ABSTRACT

A retainer for a one-way clutch is provided. In some embodiments, the retainer includes an annular portion with an inner circumferential surface, an outer circumferential surface and a first axial surface disposed between the inner circumferential surface and the outer circumferential surface. The first axial surface has a plurality of grooves, a second axial surface is disposed between the inner circumferential surface and the outer circumferential surface, and the second axial surface is configured to engage an outer race of the one-way clutch assembly. The retainer also includes a plurality of inner lobes that project generally radially inwardly from the inner circumferential surface, and are configured to engage an inner race of the one-way clutch assembly.

11 Claims, 11 Drawing Sheets

(56) References Cited

U.S. PATENT DOCUMENTS

| | | |
|---|---|---|
| 5,881,556 A | 3/1999 | Matsuoka |
| 6,615,582 B2 | 9/2003 | Yamamoto et al. |
| 6,814,203 B2 | 11/2004 | Kamiya et al. |
| 6,892,533 B2 | 5/2005 | Beattie |
| 2002/0180288 A1 | 12/2002 | Muramatsu et al. |
| 2003/0226732 A1 | 12/2003 | Kamiya et al. |
| 2005/0034951 A1 | 2/2005 | Takasu |
| 2006/0065502 A1 | 3/2006 | Joo et al. |
| 2007/0137977 A1* | 6/2007 | Peri et al. .................. 192/110 B |
| 2007/0220875 A1 | 9/2007 | Akamatsu et al. |
| 2008/0029359 A1 | 2/2008 | Takada et al. |
| 2009/0110557 A1* | 4/2009 | Brees ............................ 416/215 |

\* cited by examiner

US 8,613,352 B2

ONE-WAY CLUTCH RETAINER

CROSS-REFERENCE TO RELATED APPLICATIONS

This application is a national phase application of International Application No. PCT/US2009/050082, filed Jul. 9, 2009, which claims the benefit of U.S. Provisional Patent Application No. 61/079,561 filed Jul. 10, 2008, the disclosure of which is hereby incorporated by reference in their entirety.

STATEMENT REGARDING FEDERALLY SPONSORED RESEARCH OR DEVELOPMENT

Not applicable.

FIELD OF THE INVENTION

The invention relates to a retainer, specifically a retainer for a one-way clutch.

BACKGROUND OF THE INVENTION

Automotive assemblies, such as torque converters, typically include a set of retainers as part of a one-way clutch that performs a variety of functions. For example, the retainers may provide support and piloting for adjacent needle bearings, facilitate lubrication of the one-way clutch components, and provide piloting for the inner race of the one-way clutch. A set of retainers is typically used in which different retainers include different features to provide the functions described above. As a result, the retainers are relatively simple and typically require few manufacturing steps to produce. However, including a set of retainers can significantly increase the weight of the one-way clutch. In addition, including a set of retainers increases the number of components that are assembled when constructing the one-way clutch.

Considering the limitations of previous retainers for one way clutches, an improved design is needed.

SUMMARY OF THE INVENTION

The present invention provides a retainer for a one-way clutch. In one aspect, the retainer includes an annular portion with an inner circumferential surface, an outer circumferential surface, a first axial surface disposed between the inner circumferential surface and the outer circumferential surface. The first axial surface has a plurality of grooves, a second axial surface is disposed between the inner circumferential surface and the outer circumferential surface, and the second axial surface is configured to engage an outer race of the one-way clutch assembly. The retainer also includes a plurality of inner lobes that project generally radially inwardly from the inner circumferential surface and are configured to engage an inner race of the one-way clutch assembly.

In another aspect, the retainer includes an annular portion with an inner circumferential surface and an outer circumferential surface, a plurality of inner lobes that project generally radially inwardly from the inner circumferential surface and are configured to engage an inner race of the one-way clutch assembly, and a plurality of outer lobes that project generally radially outwardly from the outer circumferential surface and are configured to engage an outer race of the one-way clutch assembly.

In another aspect, the retainer includes an annular portion that has an inner circumferential surface, an outer circumferential surface, a first axial surface disposed between the inner circumferential surface and the outer circumferential surface. The first axial surface has a plurality of grooves, and a second axial surface is disposed between the inner circumferential surface and the outer circumferential surface. The second axial surface is configured to engage an outer race of the one-way clutch assembly. The retainer also includes a plurality of outer lobes that project generally radially outwardly from the outer circumferential surface and are configured to engage an outer race of the one-way clutch assembly.

The foregoing and other objects and advantages of the invention will appear in the detailed description that follows. In the description, reference is made to the accompanying drawings that illustrate a preferred embodiment of the invention.

DETAILED DESCRIPTION OF THE PREFERRED EMBODIMENT

Figure 15:
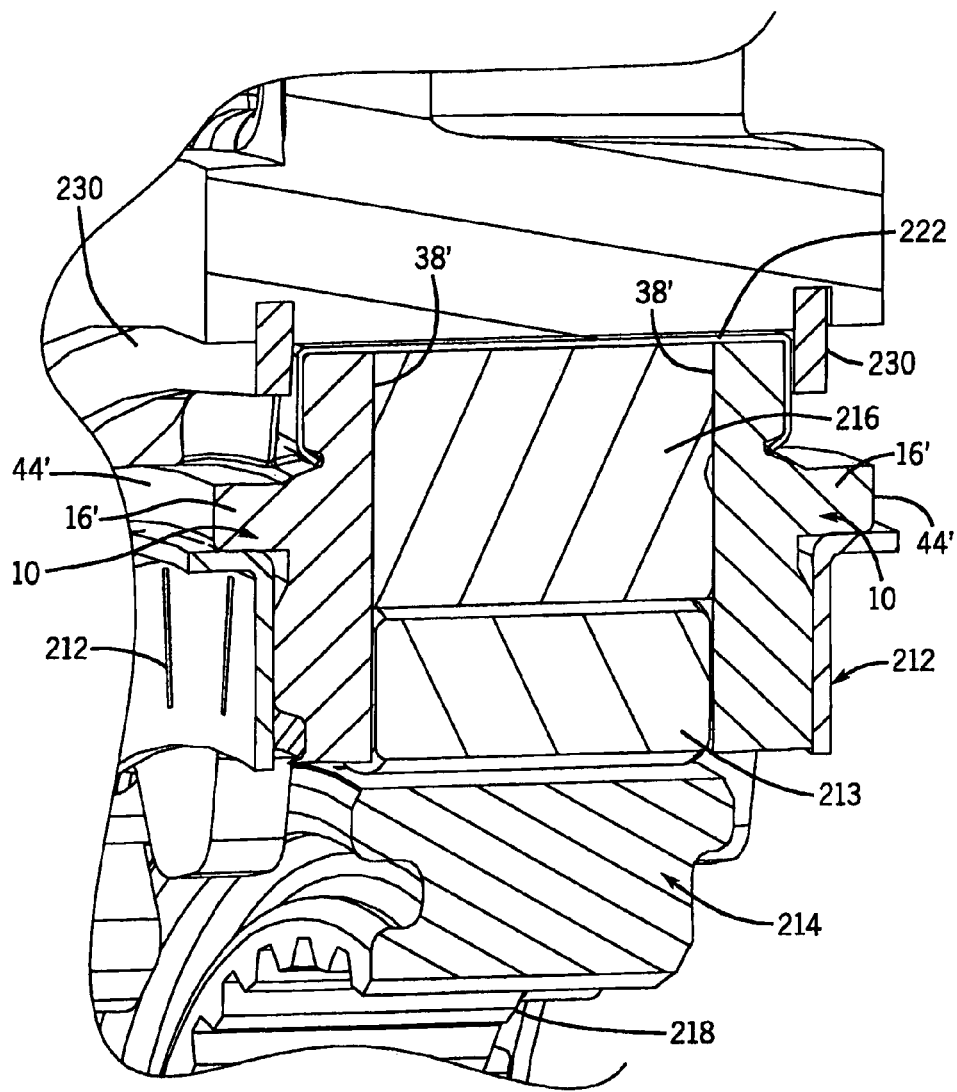
FIG. 15 is a detail view of the area defined by line 15-15 of FIG. 14.

Referring to FIGS. 1 and 13-17, a retainer 10 of the present invention is preferably part of a one-way clutch and stator assembly 210 of a torque converter. Referring to FIG. 15, two retainers 10 are included on opposite sides of the one-way clutch and stator assembly 210, and each retainer 10 engages components of the assembly such as a one-way clutch outer race 216, a one-way clutch inner race 214, and bearing races 212. Generally, the inner race 214 and the outer race 216 are similar to those known in the art. For example, a plurality of springs 211 and rollers 213 are provided in pockets 215 of the outer race 216 to engage the inner race 214. As a result, the outer race 216 rotates relative to the inner race 214 only in one direction. The retainers 10 preferably do not rotate relative to the outer race 216, and therefore, rotate relative to the inner race 214 only in one direction. In addition, the inner race 214 includes an internal spline 218 to connect to a spline shaft (not shown) fixed relative to the transmission housing.

The retainers 10 on opposite sides of the assembly are generally identical, and therefore, only one of the retainers will be described in detail. Referring to FIGS. 1-2 and 9-10, an annular portion 12 of the retainer 10 engages the outer race 216 and the bearing race 212. A first axial surface 24 (FIG. 1) of the annular portion 12 engages the bearing race 212. The first axial surface 24 is preferably generally perpendicular to a longitudinal axis 18 of the retainer 10 and generally flat except for a plurality of grooves, two of which are indicated by reference numeral 28. Those skilled in the art will appreciate that the bearing that includes the bearing race 212 engages a surface on the side of the bearing opposite the retainer 10. As such, grooves 28 are provided to define paths through which oil flows between the inside and outside circumferential ends of the bearing. The grooves 28 may be rectangular, arcuate, or other shapes. Each groove 28 is also preferably angled relative to a radius that intersects the groove 28 to provide adequate support for radially extending needles within the bearing.

Figure 9:
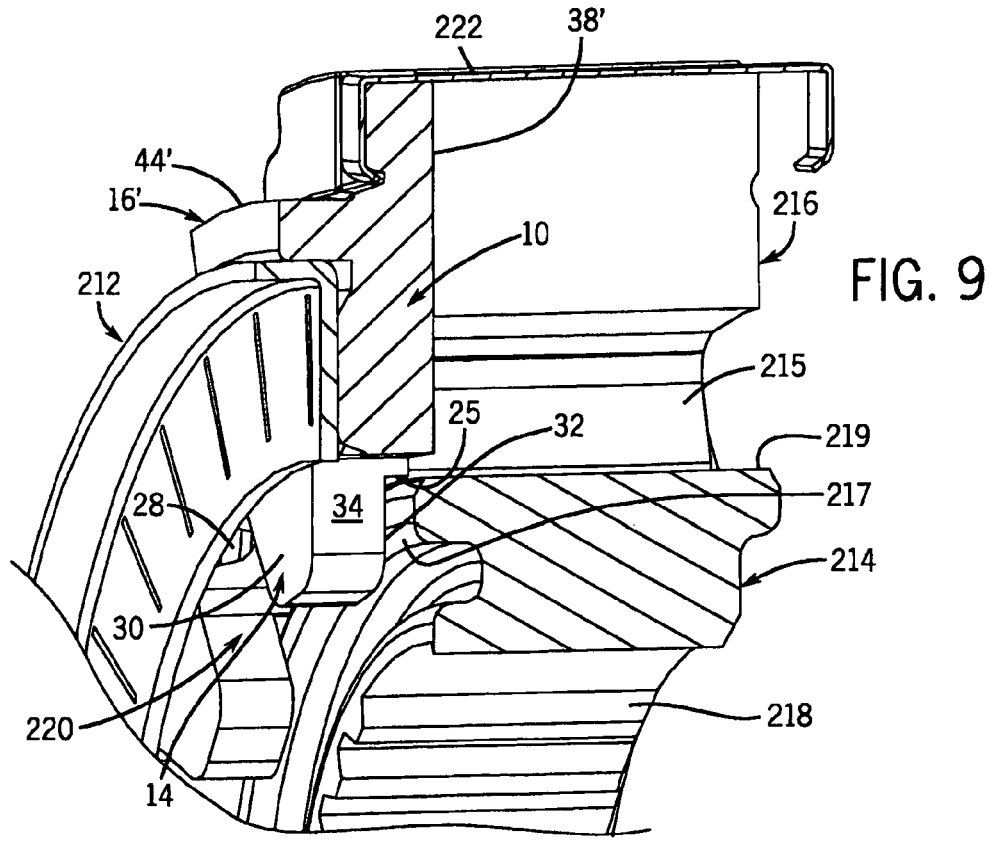
FIG. 9 is a partial sectional view of a subassembly of a one-way clutch incorporating the retainer of FIG. 1.
Figure 10:
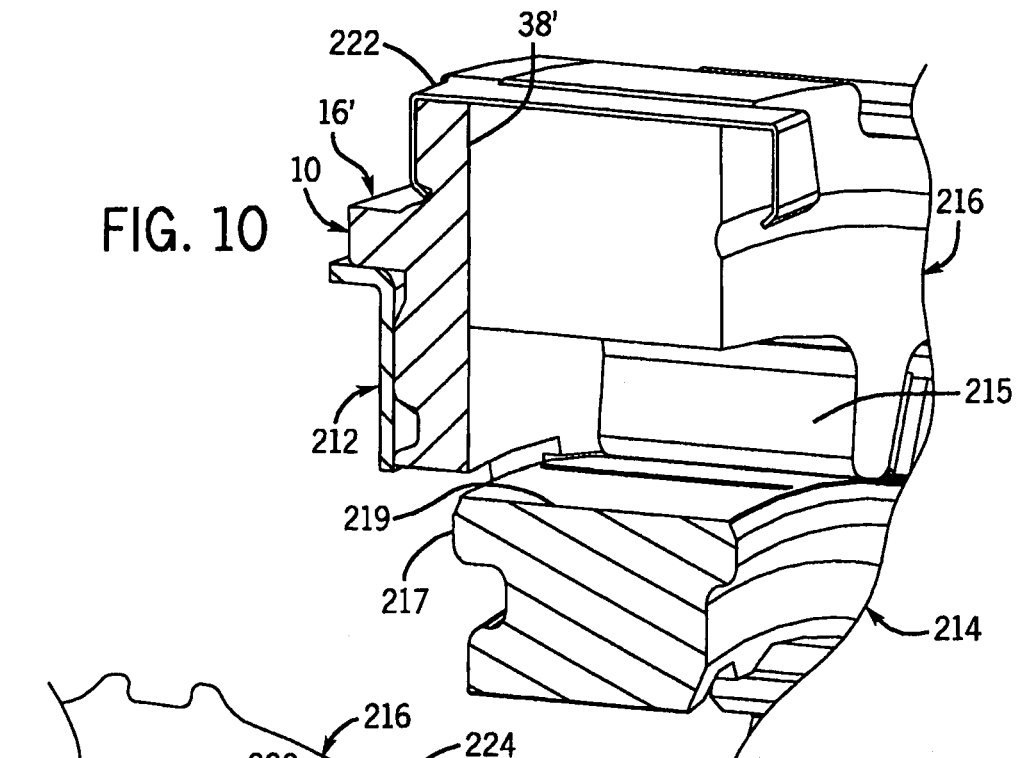
FIG. 10 is a partial sectional view of the subassembly of FIG. 9 as viewed from an opposite side.
Figure 11:
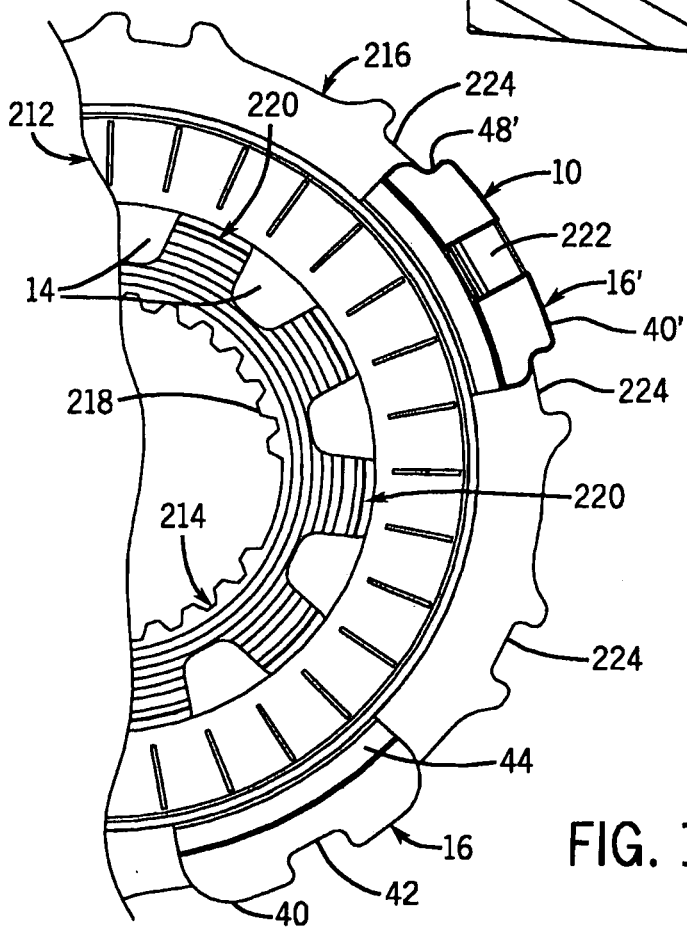
FIG. 11 is a partial top view of the subassembly of FIG. 9.
Figure 12:
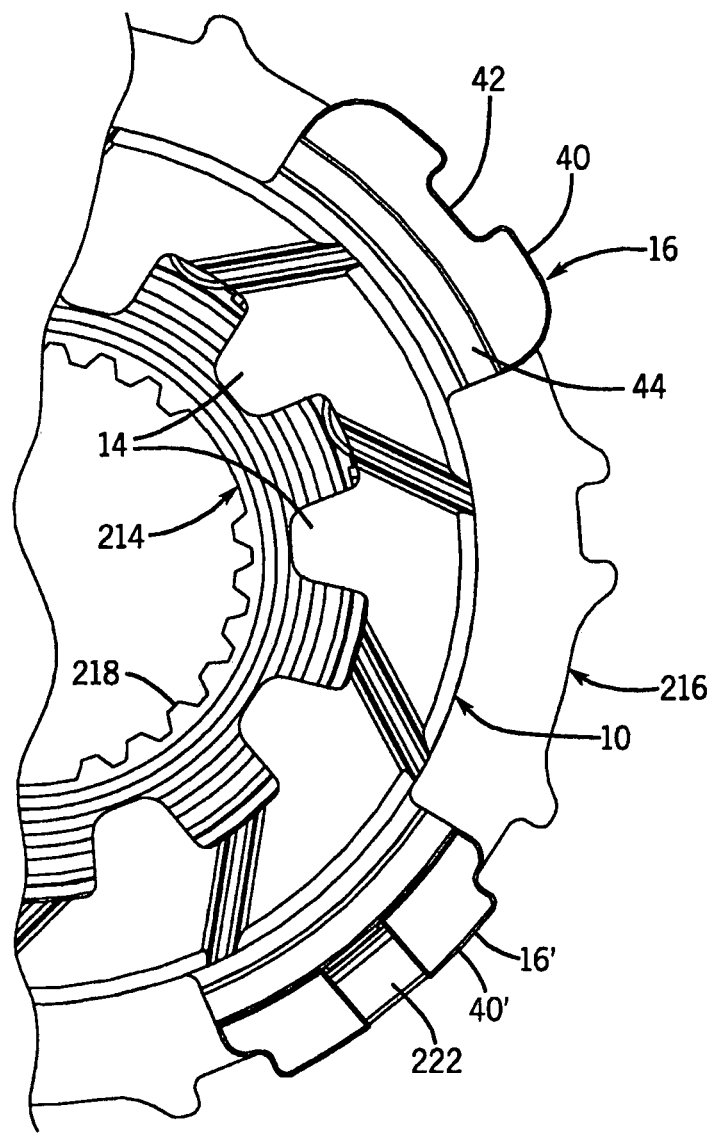
FIG. 12 is partial top view of a subassembly of a one-way clutch incorporating the retainer of FIG. 1.
Figure 13:
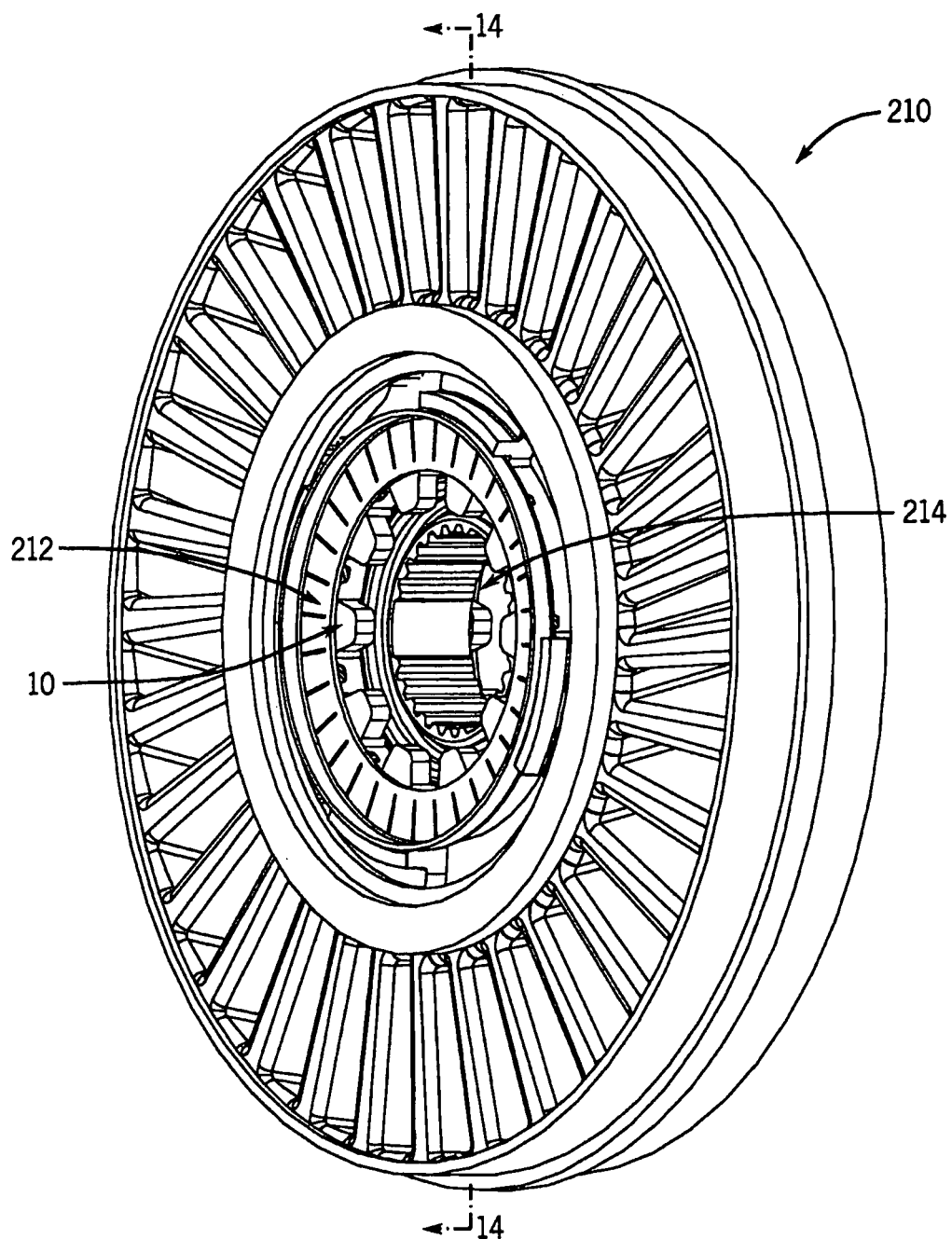
FIG. 13 is a perspective view of a stator assembly incorporating the retainer of FIG. 1.
Figure 14:
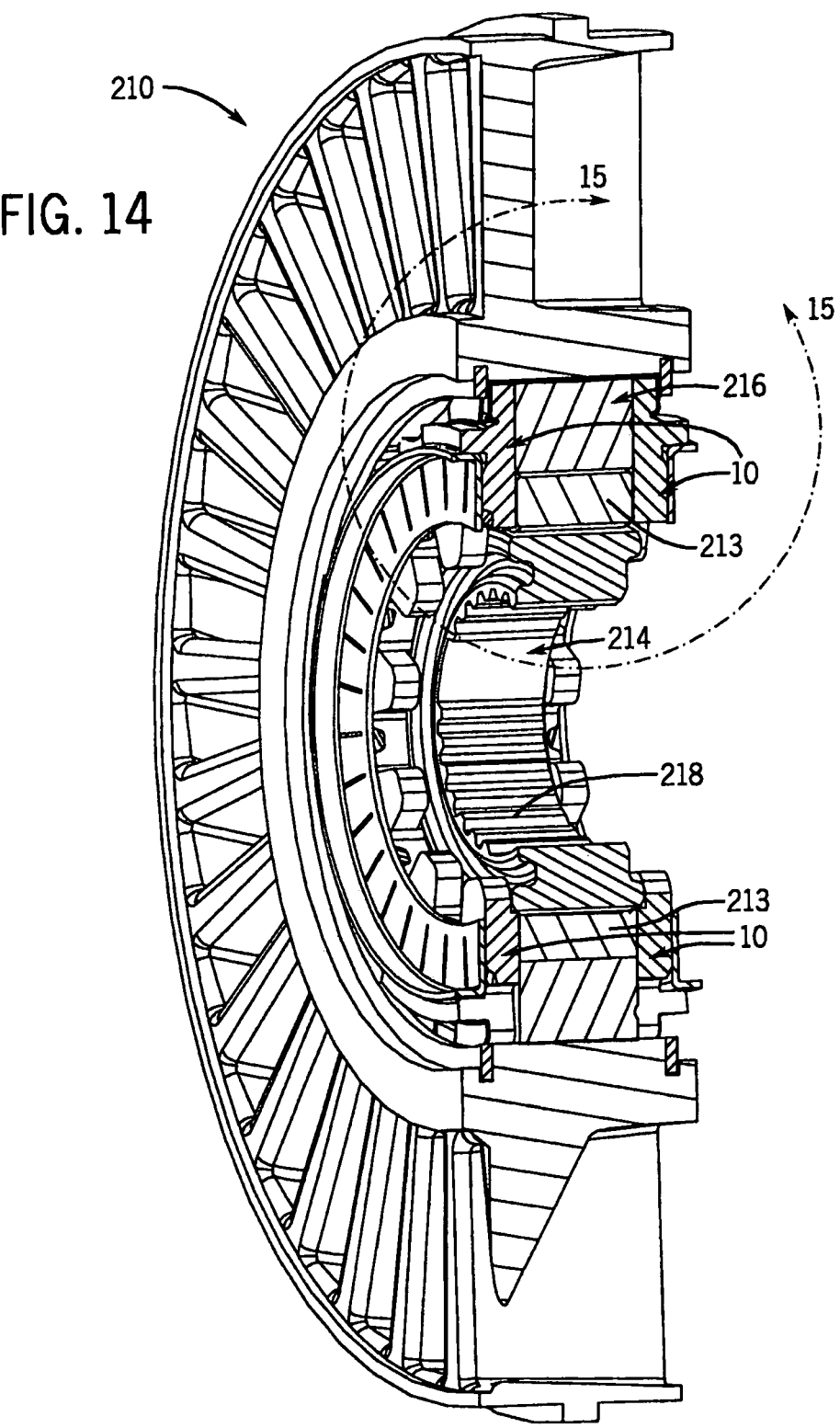
FIG. 14 is a sectional view from the line 14-14 of FIG. 13.

Referring to FIGS. 9 and 11, each of the grooves 28 is preferably in fluid communication with a gap 220. Oil may flow through the gaps 220 from one side of the one-way clutch 210 to the other. The gaps 220 are formed by a difference in diameter of the needle bearing race 212 and the inner race 214. That is, and referring to FIG. 9, specifically, an inner race outer circumferential surface 219 is preferably smaller than the inner diameter of the needle bearing race 212.

A second axial surface 26 (FIG. 2) of the annular portion 12 opposite the first axial surface 24 engages the outer race 216. The second axial surface 26 is preferably generally perpendicular to the longitudinal axis 18 and generally flat.

Figure 1:
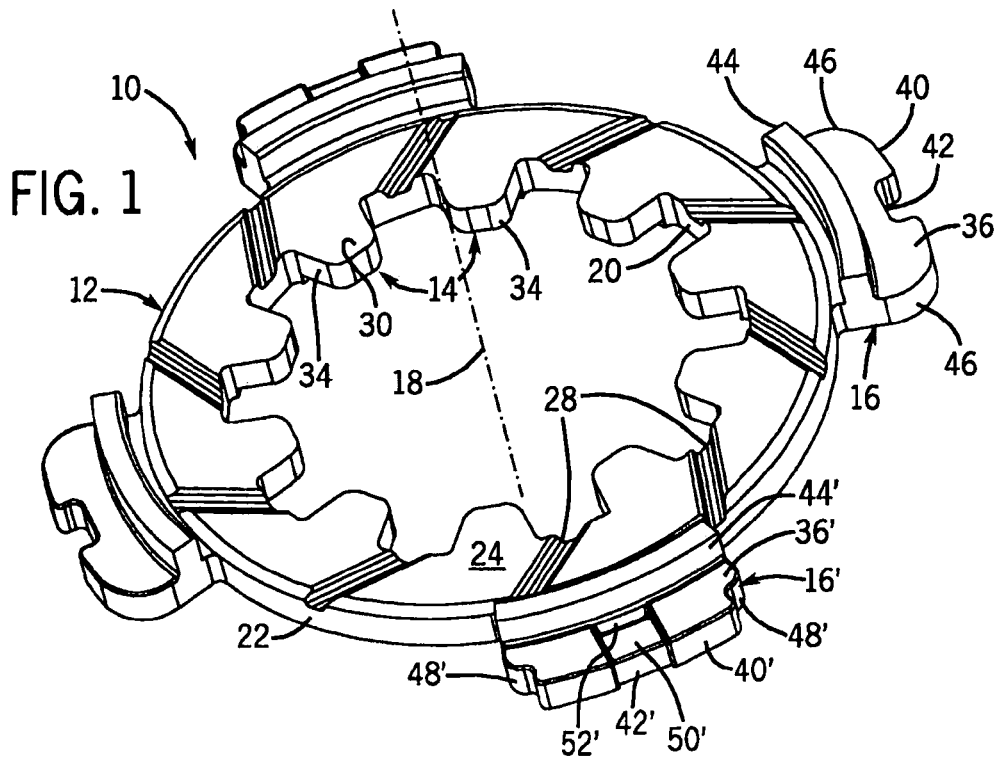
FIG. 1 is a perspective view of a retainer of the present invention.

The annular portion 12 connects to a plurality of inner lobes, two of which are indicated by reference numeral 14, that engage the inner race 214. The inner lobes 14 are positioned on an inner circumferential surface 20 of the annular portion 12 and project radially inwardly. Referring to FIG. 1, each of the inner lobes 14 includes a first axial inner lobe surface 30 that is preferably generally flat and coplanar with the first axial surface 24 of the annular portion 12.

Figure 2:
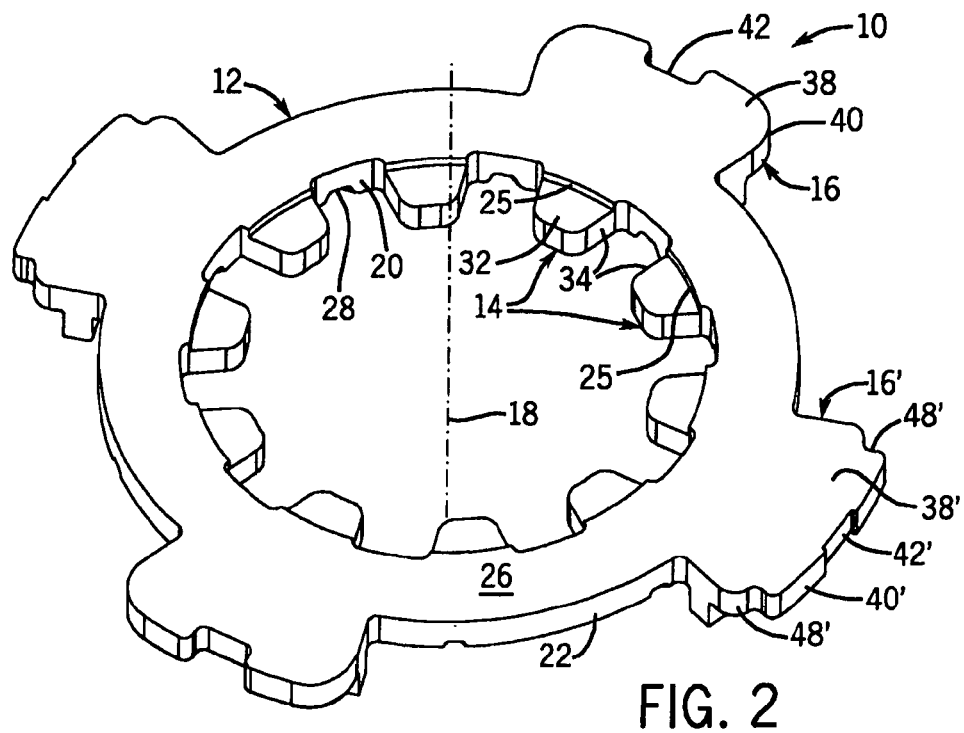
FIG. 2 is a perspective view of the retainer of FIG. 1 as viewed from an opposite side of the retainer.

Referring to FIGS. 2 and 9, each of the inner lobes 14 also includes a second axial inner lobe surface 32 that engages an inner race first axial surface 217. Each second axial inner lobe surface 32 is preferably generally flat, generally perpendicular to the longitudinal axis 18, and recessed relative to the second axial surface 26 of the annular portion 12. This provides a stepped surface 25 that engages an inner race outer circumferential surface 219. However, the fit between the stepped surfaces 25 and the inner race 214 and the fit of the inner race 214 between the two retainers 10 of the assembly are preferably loose fits. As a result, only forces of low magnitude are transmitted between the retainers 10 and the inner race 214.

Referring to FIGS. 1 and 2, an inner surface 34 is positioned between the first axial inner lobe surface 30 and the second axial inner lobe surface 32 of each inner lobe 14. The inner surface 34 is generally parallel to the longitudinal axis 18 and preferably tapers proceeding radially inwardly from an end connected to the inner circumferential surface 20 to a free end. The inner surface 34 may have rounded corners. As most clearly shown in FIG. 5, the space defined between adjacent inner lobes 14 is generally rectangular.

Figure 5:
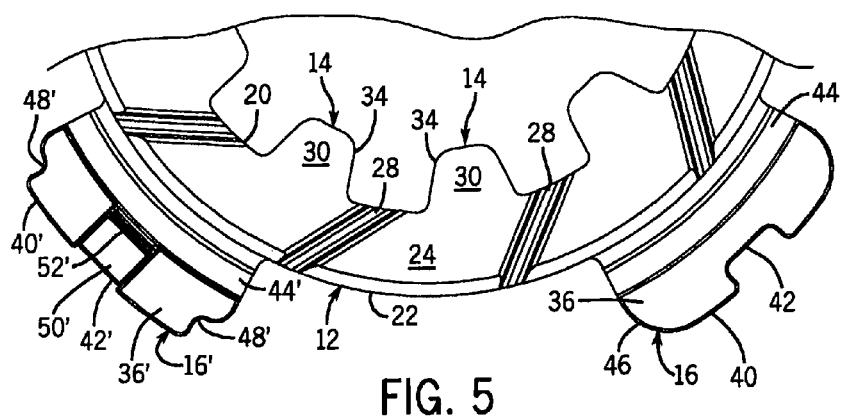
FIG. 5 is a partial top view of the retainer of FIG. 1.

Referring to FIGS. 1, 2, and 5, the retainer 10 of the present invention includes a plurality of first and second outer lobes, two of which are indicated by reference numerals 16 and 16', respectively. In general, the first and second outer lobes 16 and 16' are similar components. However, referring to FIG. 15, the second outer lobes 16' connect to fasteners 222 that engage both of the retainers 10 of the one-way clutch and stator assembly 210. Other differences of the first and second outer lobes 16 and 16' are described below.

Referring again to FIGS. 1 and 2, the first outer lobes 16 are positioned on an outer circumferential surface 22 of the annular portion 12 and project radially outwardly. The first outer lobes 16 are preferably positioned on diametrically opposite sides of the annular portion 12. The first outer lobes 16 are generally identical, so only a single first outer lobe 16 will be described. The first outer lobe 16 includes a first axial outer lobe surface 36 that is preferably recessed relative to the first axial surface 24 of the annular portion 12. As most easily appreciated from FIG. 15, the first axial outer lobe surface 36 engages a snap ring 230 of the one-way clutch and stator assembly 210. The snap rings 230 constrain the retainers 10 axially relative to the stator 226. Referring again to FIGS. 1 and 2, the first axial outer lobe surface 36 is preferably generally perpendicular to the longitudinal axis 18 except for a bearing piloting member 44 extending from the surface. The bearing piloting member 44 is preferably arcuate as viewed in the direction of the longitudinal axis 18 and has a rectangular cross section. As most easily appreciated from FIGS. 9 and 15, the bearing piloting member 44 engages the outer circumferential surface of the bearing race 212. The fit between the bearing piloting members 44 and the bearing race 212 is preferably a loose fit to permit the bearing to center itself independently from the retainer 10.

The first outer lobe 16 also includes a second axial outer lobe surface 38 that is preferably generally flat and coplanar with the second axial surface 26 of the annular portion 12. As most easily appreciated from FIGS. 9 and 15, the second axial outer lobe surface 38 engages the outer race 216.

Figure 16:
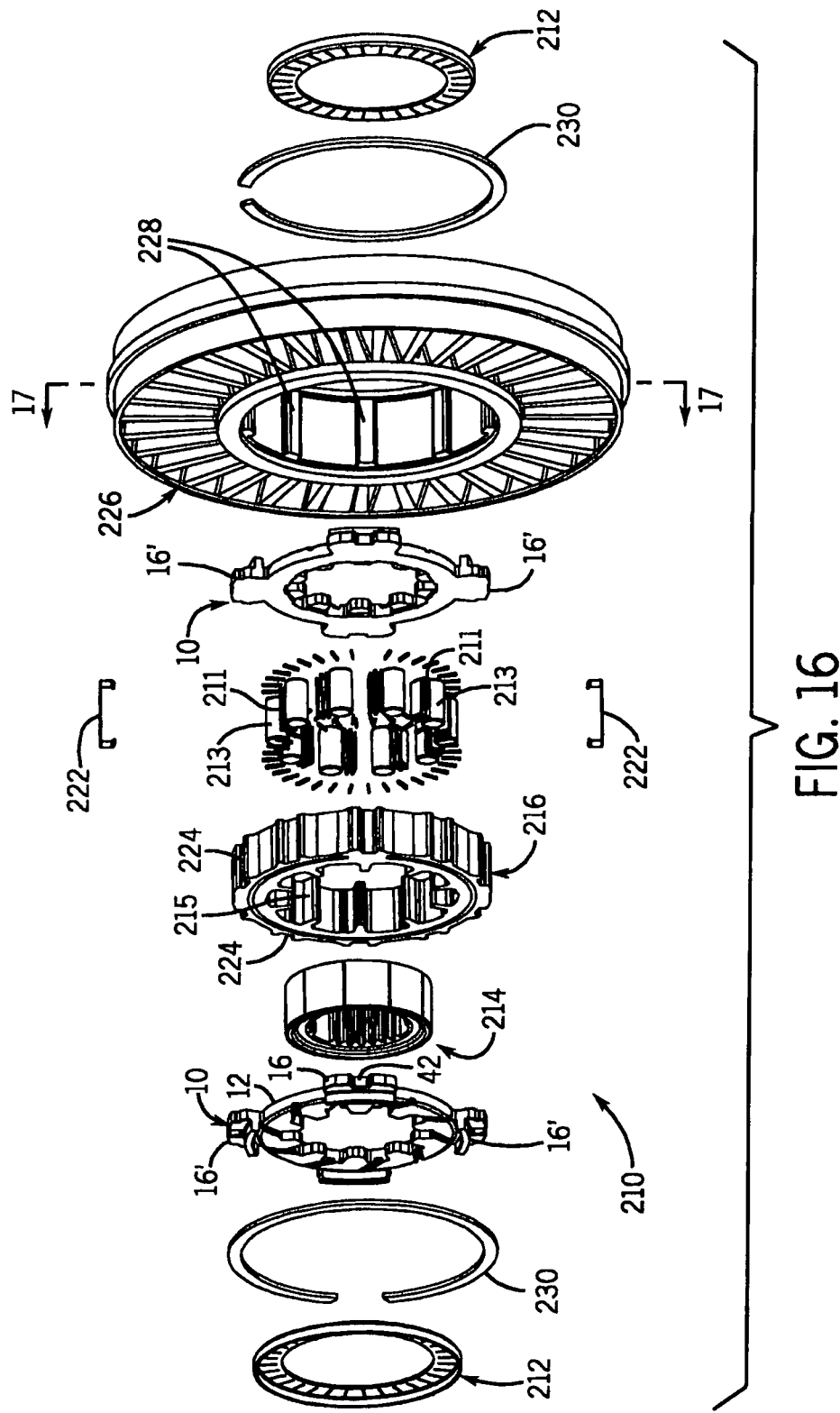
FIG. 16 is an exploded view of the stator assembly of FIG. 13.

Referring again to FIGS. 1 and 2, an outer surface 40 and a recessed surface 42 are disposed between the first and second axial outer lobe surfaces 36 and 38 and are preferably generally parallel to the longitudinal axis 18. The outer surface 40 preferably includes rounded corners 46. The recessed surface 42 preferably defines a space that opens radially outwardly. Referring to FIGS. 11 and 16, the recessed surface 42 is angularly aligned with an outer race recessed surface 224 that has generally the same shape as the recessed surface 42. As most easily appreciated from FIGS. 16 and 17, each set of recessed surfaces 42 and 224 engages a ridge 228 on the inner circumferential surface of the stator 226 to prevent rotation of the retainer 10 and the outer race 216 relative to the stator 226.

Referring again to FIGS. 1 and 2, the second outer lobes 16' are positioned on the outer circumferential surface 22 preferably 90 degrees apart from the first outer lobes 16. The second outer lobes 16' are generally identical, so only a single second outer lobe 16' will be described. The second outer lobe 16' includes a first axial outer lobe surface 36', a second axial outer lobe surface 38', an outer surface 40', a recessed surface 42', and a bearing piloting member 44'. These components are generally identical to those described in conjunction with the first outer lobes 16 with several exceptions. For example, the outer surface 40' includes stepped corners 48'. Referring to FIG. 11, the second outer lobe 16' is positioned between two of the outer race recessed surfaces 224 and the stepped sections 48' are angularly aligned with the outer race recessed surfaces 224. As a result, the second outer lobe 16' engages two of the ridges 228 on the inner circumferential surface of the stator 226.

In addition, referring to FIGS. 1 and 5, the first axial outer lobe surface 36' includes an axial recessed surface 50' and a blind recessed surface 52'. The axial recessed surface 50' and the blind recessed surface 52' together define a three-dimensional generally L-shaped space in the second outer lobe 16'.

Referring to FIGS. 9 and 15, the generally L-shaped space provides a feature for the fastener 222 to engage.

The retainer 10 of the present invention is preferably a powder metal component. Processes for forming powder metal components are well known in the art. Forming the retainer 10 as a powder metal component is advantageous as the features of the retainer 10 described above may be formed during a single processing step. Other processes, such as machining, could require individual steps to form the different features of the retainer 10. In addition, the retainer 10 advantageously provides various positioning features in a compact design.

Figure 3:
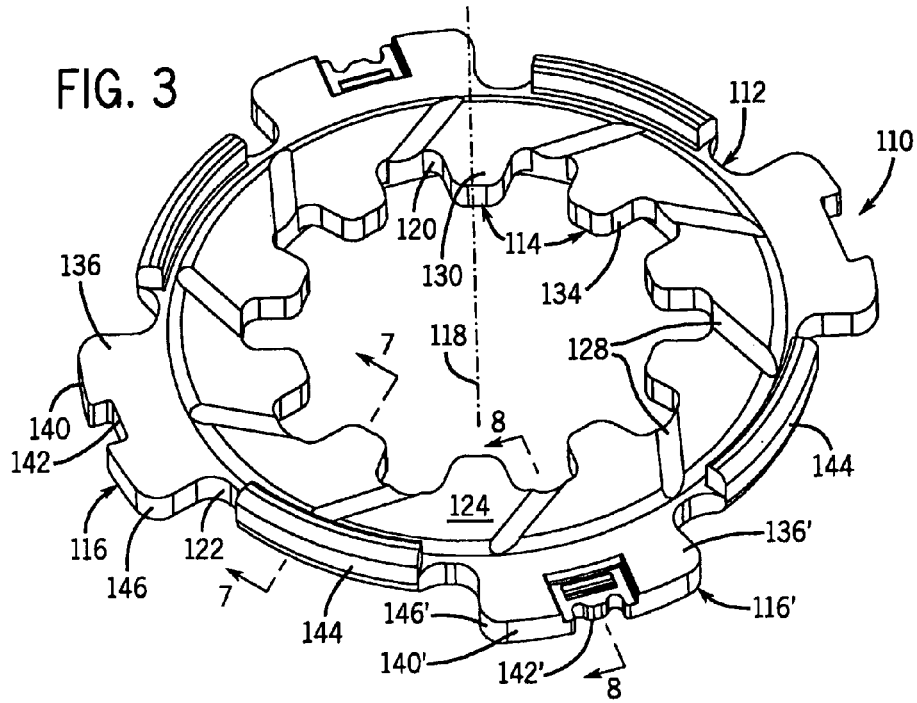
FIG. 3 is a perspective view of a second embodiment of the retainer of the present invention.
Figure 4:
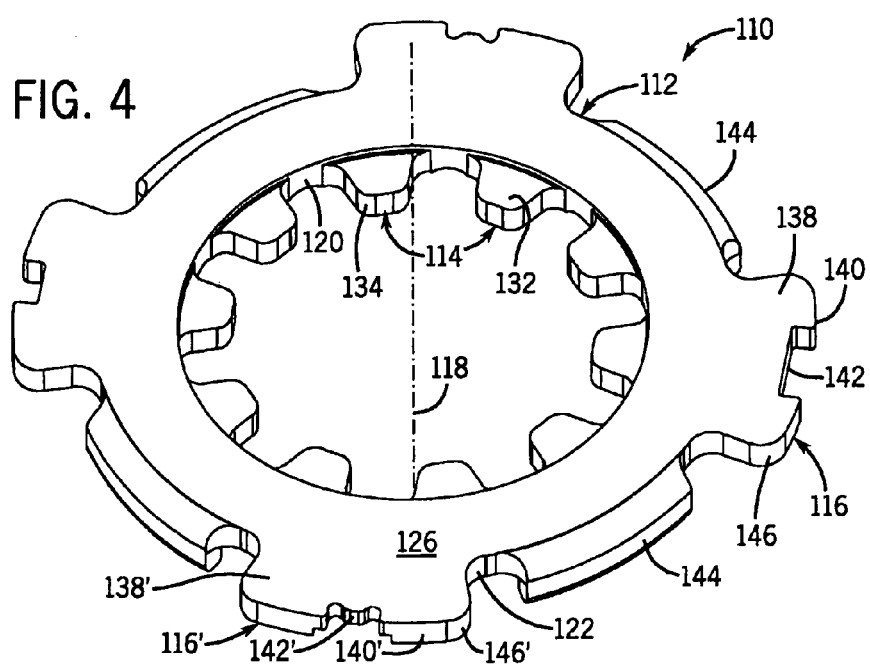
FIG. 4 is a perspective view of the retainer of FIG. 3 as viewed from an opposite side of the retainer.
Figure 6:
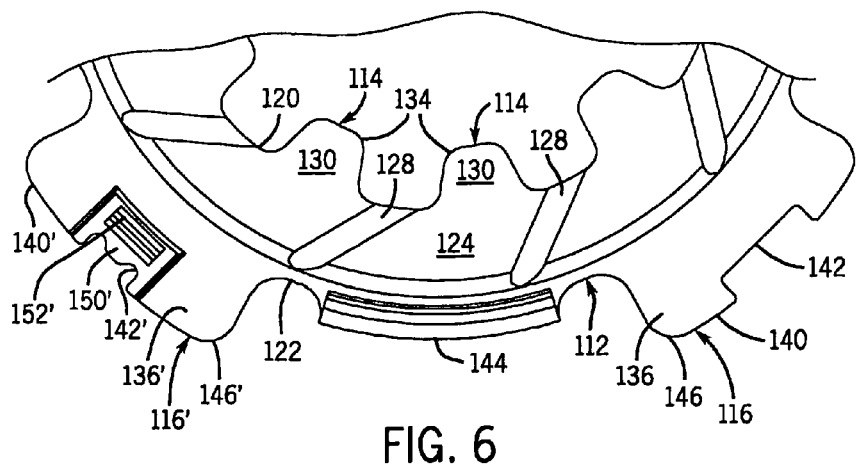
FIG. 6 is a partial top view of the retainer of FIG. 3.

Referring to FIGS. 3, 4, and 6, a second embodiment of the retainer 110 of the present invention is shown. The retainer 110 includes an annular portion 112, a plurality of inner lobes, two of which are indicated by reference numeral 114, a plurality of first and second outer lobes, two of which are indicated by reference numerals 116 and 116', respectively, and a plurality of bearing piloting members 144. The annular portion 112 defines a longitudinal axis 118 and includes an inner circumferential surface 120, an outer circumferential surface 122, a first axial surface 124, a second axial surface 126, and a plurality of grooves 128. These components are generally identical to those described in conjunction with the first embodiment of the retainer 10, and therefore will not be described in further detail.

Each of the inner lobes 114 includes a first axial inner lobe surface 130, a second axial inner lobe surface 132, and an inner surface 134. These components are generally identical to those described in conjunction with the first embodiment of the retainer 10, and therefore will not be described in further detail.

Figure 7:
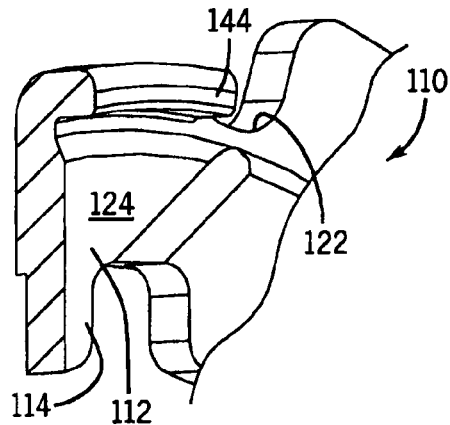
FIG. 7 is a partial sectional view from the line 7-7 of FIG. 3.
Figure 8:
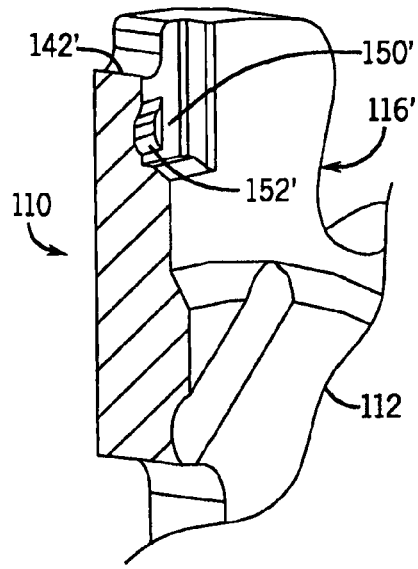
FIG. 8 is a partial sectional view from the line 8-8 of FIG. 3.

Each of the first outer lobes 116 includes a first axial outer lobe surface 136, a second axial outer lobe surface 138, an outer surface 140, a recessed surface 142, and rounded corners 146. These components are generally identical to those described in conjunction with the first embodiment of the retainer 10 with one exception: the bearing piloting members 144 are not positioned on the first outer lobes 116. Instead, the bearing piloting members 144 are preferably positioned 45 degrees apart from the first outer lobes 116 because the retainer 110 is preferably a stamped component. Those skilled in the art will appreciate the difficulty in providing bearing piloting members 144 on the first outer lobes 116 if a stamping process is used. Referring to FIGS. 3 and 7, each of the bearing piloting members 144 includes a section that projects radially outwardly from the outer circumferential surface 122 and a section the projects above the first axial surface 124.

Each of the second outer lobes 116' includes a first axial outer lobe surface 136', a second axial outer lobe surface 138', an outer surface 140', a recessed surface 142', an axial recessed surface 150', and a blind recessed surface 152'. These components are generally identical to those described in conjunction with the first embodiment of the retainer 10 with several exceptions. For example, the bearing piloting members are not positioned on the second outer lobes 116'. Instead, the bearing piloting members 144 are preferably positioned 45 degrees apart from the second outer lobes 116'. In addition, the second outer lobes 116' do not include stepped surfaces, but instead include rounded corners 146'.

Furthermore, the recessed surfaces 142' that support the fasteners 222 preferably include rounded corners because such features are easily formed during manufacturing of the retainer 110. However, the clearance between the sides of the recesses 142' and the fasteners 222 is preferably small to prevent misalignment of the retainer 110 and the outer race 216 during assembly. The rounded corners of the recessed surfaces 142' may not provide adequate support for the fasteners 222 while preventing misalignment, so each recessed surface 142' preferably includes an elevated portion between the rounded corners to support the fasteners 222.

Figure 17:
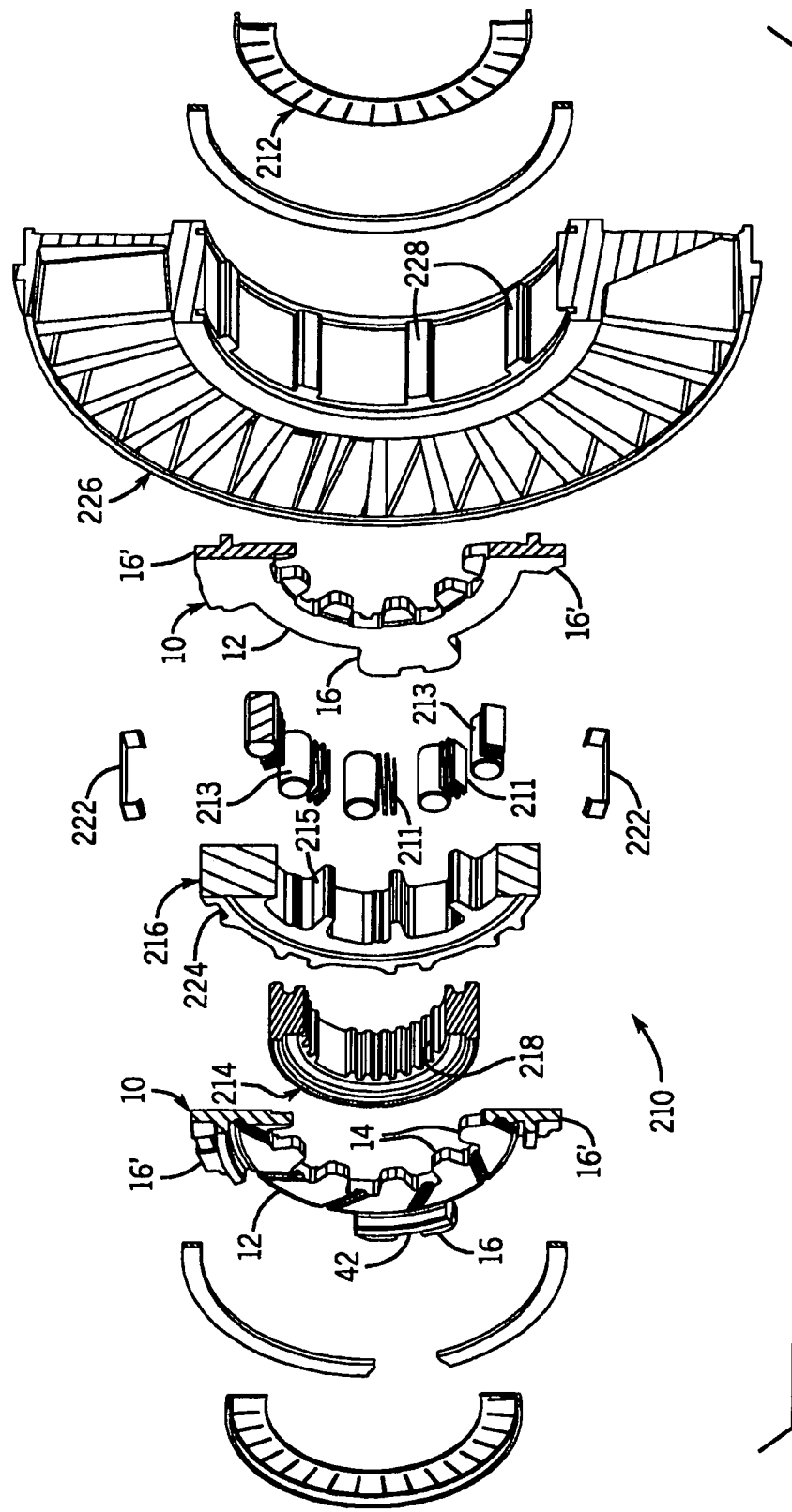
FIG. 17 is a sectional view from the line 17-17 of FIG. 16.

Further still and referring to FIGS. 3, 4, and 17, the stator 226 and the outer race 216 may include a ridge 228 and a corresponding recessed surface 224, respectively, that are spaced apart from adjacent ridges 228 and recessed surfaces 224 by different angles (e.g., one set of ridges 228 and recessed surfaces 224 may be offset from one adjacent pair by 34 degrees and a second adjacent pair by 38 degrees). Such a feature ensures the outer race 216 is connected to the stator 226 in the proper orientation (i.e., so that the outer race 216 locks and rotates in the proper directions). The retainer 110 preferably includes one elongated recessed surface 142 to accommodate the offset ridge 228 of the stator 226 and permit generally identical retainers 110 to be positioned on both sides of the outer race 216.

It is specifically intended that the present invention not be limited to the embodiments and illustrations contained herein, but include modified forms of those embodiments including portions of the embodiments and combinations of elements of different embodiments as come within the scope of the following claims.

We claim:

1. A one-way clutch assembly, comprising:
    an outer race; and
    a retainer having:
        an annular portion including:
            an inner circumferential surface;
            an outer circumferential surface;
            a first axial surface disposed between the inner circumferential surface and the outer circumferential surface, and the first axial surface having a plurality of grooves;
            a second axial surface disposed between the inner circumferential surface and the outer circumferential surface, and the second axial surface being configured to engage an outer race of the one-way clutch assembly;
        a plurality of outer lobes projecting generally radially outwardly from the outer circumferential surface and being configured to engage an outer race of the one-way clutch assembly;
        a plurality of bearing piloting members projecting axially from the first axial surface radially outward of the grooves;
    wherein the outer lobes have a plurality of corners, and at least two of the corners are defined by a stepped surface, the stepped surfaces being configured to engage at least one ridge on an inner circumferential surface of a stator; and
    wherein the outer race has an outer surface that corresponds with the stepped surface so as to engage said at least one ridge.

2. The retainer of claim 1, wherein each of the plurality of grooves is positioned at an angle relative to a radius of the annular portion.

3. The retainer of claim 1, wherein each of the plurality of outer lobes includes a first axial outer lobe surface and a second axial outer lobe surface, and the second axial outer lobe surfaces of the plurality of outer lobes are coplanar with the second axial surface of the annular portion.

4. The retainer of claim 3, wherein at least a portion of the first axial outer lobe surfaces of the plurality of outer lobes are coplanar with the first axial surface of the annular portion.

5. The retainer of claim 1, further comprising a plurality of inner lobes projecting radially inwardly from the inner circumferential surface.

6. The retainer of claim 1, wherein each of the plurality of bearing piloting members projects from an outer lobe.

7. The retainer of claim 1, wherein at least one of the outer lobes includes a fastening feature on an axially facing side of the outer lobe.

8. A retainer for a one-way clutch assembly, comprising:
an annular portion including:
- an inner circumferential surface;
- an outer circumferential surface;
- a first axial surface disposed between the inner circumferential surface and the outer circumferential surface, and the first axial surface having a plurality of grooves;
- a second axial surface disposed between the inner circumferential surface and the outer circumferential surface, and the second axial surface being configured to engage an outer race of the one-way clutch assembly;
- a plurality of outer lobes projecting generally radially outwardly from the outer circumferential surface and being configured to engage an outer race of the one-way clutch assembly;
- a fastening feature on an outer end of at least one of the outer lobes, the fastening feature comprising an outer surface generally in the shape of a "W".

9. A retainer as claimed in claim 8, wherein the fastening feature has rounded corners at the lower corners of the "W" shape.

10. A retainer as claimed in claim 9, wherein the fastening feature includes an elevated portion between the rounded corners to help support a fastener.

11. A retainer as claimed in claim 8, wherein each fastening feature has an axially facing surface with a recess in it.

* * * * *